Figure 1:
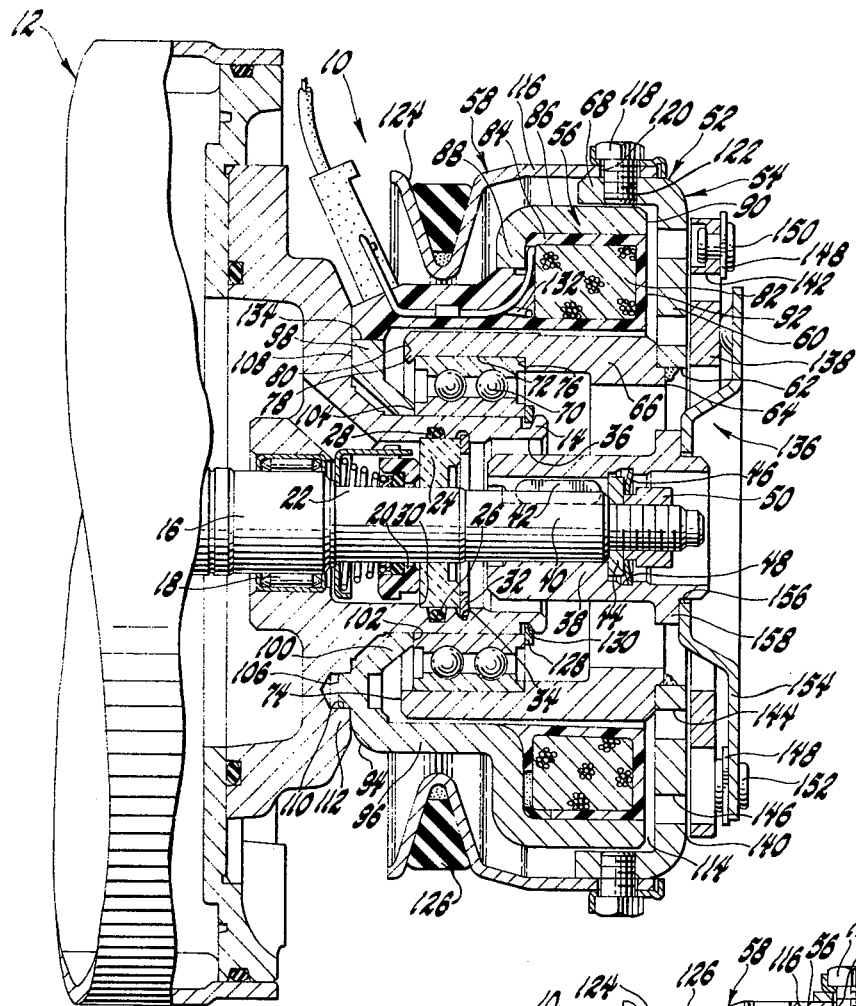

United States Patent [19]

Briar

[11] 3,876,048

[45] Apr. 8, 1975

[54] ELECTROMAGNETIC CLUTCH
[75] Inventor: John R. Briar, Dayton, Ohio
[73] Assignee: General Motors Corporation, Detroit, Mich.
[22] Filed: Feb. 11, 1974
[21] Appl. No.: 441,045

[52] U.S. Cl............... 192/84 C; 74/574; 192/30 V
[51] Int. Cl.............................................. F16d 27/10
[58] Field of Search............ 192/30 V, 84 C; 74/574

[56] References Cited
UNITED STATES PATENTS
3,205,989  9/1965  Mantey.............................. 192/84 C
3,384,213  5/1968  Bernard et al..................... 192/84 C
3,455,421  7/1969  Miller................................ 192/84 C

*Primary Examiner*—Allan D. Herrmann
*Attorney, Agent, or Firm*—John P. Moran

[57] ABSTRACT

An electromagnetic clutch wherein rotor and pulley assemblies are detachably interconnected and serve to contain a coil assembly prior to installation of the complete rotor-pulley-coil mechanism as a unit on an automotive air-conditioning compressor, with the added advantage that the resultant assembly embodies a reduced pulley diameter and a minimal pulley groove-to-compressor mounting bracket distance, thus assuring more efficient use and operation of the compressor.

7 Claims, 2 Drawing Figures

3,876,048

ELECTROMAGNETIC CLUTCH

This invention relates generally to electromagnetic clutches and, more particularly, to such clutches wherein the rotor, pulley, and coil portions thereof are assembled as a complete subassembly prior to installation on an automotive compressor.

Heretofore electromagnetic clutches have generally been assembled, one component at a time, on an automotive air-conditioning compressor. It is of considerable production advantage to be able to complete subassemble the major components of the clutch "off-track" and then add same to the compressor substantially as a single package.

Accordingly, an object of the invention is to provide an electromagnetic clutch which may be substantially completely assembled off the compressor assembly line and then assembled as a unit on the compressor.

Another object of the invention is to provide a self-contained electromagnetic clutch subassembly which includes a pulley assembly, a coil and coil housing assembly, and a pole member or rotor assembly, the latter including axially retained bearing suitable for mounting on a compressor.

A further object of the invention is to provide such a pulley-coil-rotor-bearing assembly wherein the coil subassembly thereof is contained both radially and axially by respective portions of the pulley and rotor assemblies.

Still another object of the invention is to provide an electromagnetic clutch wherein the pulley groove is formed radially inwardly of a pulley rim member such that the pulley groove serves to "lock in" the coil and coil housing in a location intermediate the pulley groove and the clutch rotor.

A still further object of the invention is to provide a coil and coil housing subassembly which is retained between a clutch rotor and a pulley mechanism, with an extension of the coil housing extending axially past the pulley groove in order to abut against a bearing secured to the rotor assembly to thereby locate the coil assembly relative to the rotor, and to abut against a wall of the compressor to thereby locate the complete pulley, rotor, and coil package with respect to the compressor.

A still further object of the invention is to provide an improved electromagnetic clutch wherein the pulley groove is (1) reduced in diameter in order to effectuate a higher compressor capacity, and (2) located immediately adjacent the end wall of the compressor in order to effectuate the shortest possible distance between the pulley groove and the compressor mounting bracket; thus, more readily permitting the mounting of the compressor and clutch assembly in front of the engine block.

Yet another object of the invention is to provide a damper mechanism which may be readily added to the above-described preassembled pulley-rotor-coil-bearing subassembly prior to assembly of the five-component package on an automotive air-conditioning compressor.

Figure 2:
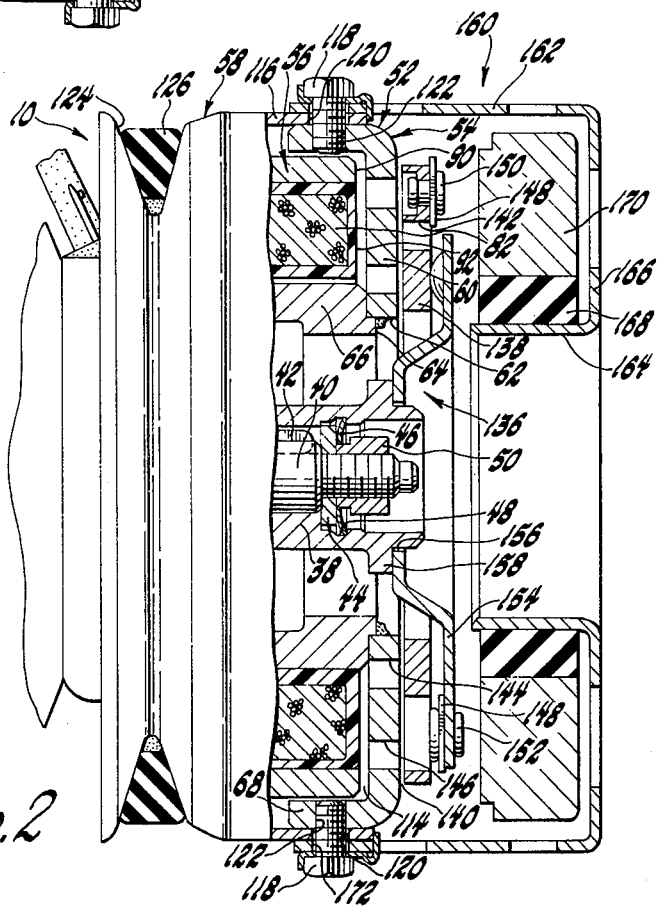

These and other objects and advantages of the invention will be apparent when reference is made to the following description and accompanying drawings, wherein:

FIG. 1 is a cross-sectional view illustrating an electromagnetic clutch embodying the invention; and FIG. 2 is a fragmentary cross-sectional view of an alternate embodiment of a portion of the FIG. 1 structure.

Referring now to the drawings in greater detail, FIG. 1 illustrates an electromagnetic clutch 10 suitable for driving an automotive air-conditioning compressor 12, on the forward end of which is formed a fixed tubular extension 14. An output or drive shaft 16 for driving the compressor 12 is rotatably mounted on needle bearings 18, and extends outwardly through the center of the tubular extension 14. A rotating shaft seal 20 is mounted around a reduced intermediate portion 22 of the drive shaft 16. The shaft seal 20 is in sealing engagement with a stationary seal ring 24, the latter being sealed to the tubular extension 14 by an O-ring-type seal ring 26 mounted in a first groove 28 formed in the inner peripheral surface of the tubular extension 14. The seal ring 24 is confined axially between a shoulder 30 formed within the tubular extension 14 and a split locking ring 32 mounted in a second groove 34 formed in the inner peripheral surface of the tubular extension 14. The inner bore of the tubular extension 14 is enlarged at 36 to facilitate assembly and removal of the locking ring 32, the stationary seal ring 24, and the rotating part of the shaft seal 20.

The enlarged inner bore 36 of the tubular extension 14 provides space for the accommodation of the greater portion of a drive hub 38 which is mounted upon a reduced end portion 40 of the shaft 16. The drive hub 38 is keyed to the shaft-end portion 40 by a suitable key 42 and is retained thereon by a washer 44 and a lock-washer 46, the washer 44 and the lock-washer 46 being confined in a stepped annular groove 48 formed within the drive hub 38 by a nut 50 threadedly mounted on the shaft-end 40.

A drive-components subassembly 52 is preassembled prior to installation on the tubular extension 14 of the compressor 12. As will be seen, the drive-components subassembly 52 includes the major components of the electromagnetic clutch 10, for example, a rotor assembly 54, a coil assembly 56, and a pulley assembly 58.

The rotor assembly 54 portion of the drive-components subassembly 52 includes an annular radially extending pole member or clutch rotor 60 secured adjacent a central opening 62 thereof to an end face 64 of a sleeve member 66 by any suitable means, such as welding. An axially extending collar or flange 68 is formed at the outer periphery of the rotor 60 for a purpose to be described. A bearing 70 is mounted in a counterbore 72 formed within the other end face 74 of the sleeve member 66. The bearing 70 is retained therein and against a shoulder 76 at the inner end of the counterbore 72 by means of a plurality of equally spaced tabs 78 formed on the end face 74 of the sleeve member 66 by a staking operation performed at selected points represented by the reference numeral 80. Thus it may be noted that the rotor 60, the sleeve member 66, and the bearing 80 constitute the rotor assembly 54 as one integral unit.

The coil assembly 56 includes an annular electromagnetic coil 82, of a predetermined number of turns, embedded within a suitable resin 84, such as epoxy or nylon, or polyester resin, which is cast within an annular coil housing 86, the latter being formed of paramagnetic material, such as steel or malleable iron. The coil housing 86 includes a closed end 88 and an open end 90, the latter being aligned with an end face 92 of the resin 84. A substantially toroidal-shaped end portion 94 is formed on the coil housing 86, extending from the closed end 88, such toroidal-shaped end portion 94 including an axially extending portion 96, an inwardly extending radial portion 98 formed on the end of the portion 96, and a reverse axial extending portion 100. A radial face 102 is formed on the portion 100, and abuts against an end face 104 of the bearing 70 once the coil housing 86 is mounted around the sleeve member 66. A plurality of equally spaced, axially extending bosses 106 are formed on a face 108 of the toroidal radial portion 98 for mounting cooperation with a plurality of equally spaced openings 110 formed in the front wall 112 of the compressor 12. With the radial face 102 abutted against the end face 104 of the bearing 70, the resin end face 92, and thus the adjacent end face of the coil 82, is positioned a predetermined gap or space 114 width away from the adjacent face of the clutch rotor 60.

The pulley assembly 58 portion of the drive-components subassembly 52 includes a cylindrical outer wall or rim member 116 locked in place on the axial collar 68 of the clutch rotor 60 by a plurality of bolts 118 mounted through respective openings 120 formed adjacent an end of the rim member 116 and threadedly connected to respective threaded openings 122 formed in the rotor collar 68. The pulley assembly 58 further includes a pulley groove 124 formed radially inwardly of the end of the rim member 116 opposite the end thereof secured by the bolts 118. An engine-driven belt 126 is mounted in the pulley groove 124.

It may be noted that, by virtue of the pulley groove 124 being formed radially inwardly of the rim member 116, the coil housing 86 is effectively "locked in" as a part of the complete drive-components subassembly 52 prior to the installation of the latter on the tubular extension 14. Once thus assembled, the drive-components subassembly 52 is retained in place by a snapring 128 mounted in a groove 130 formed adjacent the end of the tubular extension 14. Suitable wire leads 132 extend from the coil 82 and then from the drive-components subassembly 52 through an opening 134 formed in the axial extending portion 96 and the radial portion 98 of the coil housing 86.

Lastly, an armature plate-driven plate subassembly 136 is mounted on the drive hub 38, the subassembly 136 including an armature plate 138, shown in a deenergized position adjacent the outer face of the pole member or rotor 60, there being a variable width radially extending gap or space 140 therebetween. A concentric row of conventional equally spaced arcuate slots 142 are formed in the armature plate 138 radially intermediate two concentric rows of equally spaced arcuate slots 144 and 146 formed in the clutch rotor 60. The armature plate 138 is retained adjacent the rotor 60 by virtue of a plurality of leaf springs 148, each of which is secured by a rivet 150 at one end thereof to the armature plate 138 and at the other end thereof by rivets 152 to a support member or drive plate 154. The drive plate 154 is secured adjacent a central opening 156 formed therein to the outer end of the drive hub 38, abutted against a flange 158 formed on the latter. It may be noted that the assembly of the armature plate 138 and the associated drive plate 154 onto the drive hub 38 in a spaced relationship with the clutch rotor 60 of the drivecomponents subassembly 52 would complete the assembly of the electromagnetic clutch 10 on the compressor 12.

Operation

In operation, the clutch 10 is engaged by the energization of the electromagnetic coil 82 which causes the magnetic flux to traverse a path through the adjacent paramagnetic material, i.e., from the coil 82 to the adjacent outer wall of the coil housing 86, and then across the gap 114 to the clutch rotor 60, thereafter traversing a serpentine path through the clutch field resulting from the spaced relationship of the alternately located cooperating arcuate slots 142, 144, and 146, thereby closing the gap 140, to drive the armature plate 138 and drive plate 154 along with the rotor 60 and the pulley assembly 58. The flux completes its path of travel back to the coil 82 via the sleeve member 66.

FIG. 2 Embodiment

Referring now to FIG. 2, it may be noted that a damper assembly 160 may be readily added to the electromagnetic clutch 10. The damper assembly 160 includes a cylindrical outer wall 162 and a concentric cylindrical inner wall 164 interconnected at one of each of the ends thereof by a radial end wall 166. A suitable rubber ring 168 is secured at its inner peripheral surface to the outer peripheral surface of the inner wall 164, and a metal ring member, such as a cast iron ring 170, is, in turn, secured at its inner peripheral surface to the outer peripheral surface of the rubber ring 168.

The damper assembly 160 is mounted on the electromagnetic clutch 10 simply by inserting the bolts 118 through respective openings 172 formed through the cylindrical outer wall 162 adjacent the end thereof opposite the radial end wall 166, and thence through the openings 120 in the rim member 116 of the pulley assembly 58, and into the threaded openings 122 formed in the rotor flange 68.

It should be apparent that the invention provides an improved electromagnetic clutch wherein major portions thereof may be completely subassembled off-track, providing for a more efficient compressor assembly line operation, as well as providing for a more efficient use and operation of the compressor in the engine compartment of an automotive vehicle once the subject clutch is assembled on the compressor.

While but one general embodiment of the invention has been shown and described, other modifications thereof are possible. I claim:

1. For use with an air-conditioning compressor including a casing having a fixed tubular extension extending from an end surface thereof and a drive shaft extending centrally through said tubular extension with a drive hub secured to said drive shaft; an electromagnetic clutch comprising a drivecomponents subassembly, said drive-components subassembly including detachably interconnected rotor and pulley assemblies, said rotor assembly forming an end wall and an annular inner wall and said pulley assembly forming another end wall and an annular outer wall of a drive-components housing, a coil assembly including a coil housing and a coil mounted within said coil housing, said coil assembly being mounted within said drive-components housing and retained axially and radially by said respective walls of said interconnected rotor and pulley assemblies, a bearing secured axially against an inner peripheral surface of said annular inner wall of said rotor assembly for rotatably mounting said drivecomponents subassembly on said tubular extension, and an extended portion of said coil housing extending beyond said another end wall for abutting against said compressor end surface and an end face of said bearing, thereby locating both said coil assembly axially with respect to said drive-components housing and said drive-components subassembly axially with respect to said compressor casing; fastener means adjacent the other end face of said bearing for retaining said drive-components subassembly axially in place on said tubular extension; and an armature plate and drive plate subassembly mounted on said drive hub such that the armature plate thereof is positioned radially adjacent said end wall of said rotor assembly for being drivingly connected to said end wall of said rotor assembly upon energization of said coil.

2. For use with an air-conditioning compressor including a casing having a fixed tubular extension extending from an end wall thereof and a drive shaft extending centrally through said tubular extension with a drive hub secured to said drive shaft; an electromagnetic clutch comprising a drive-components subassembly, said drive-components subassembly including a detachably interconnected rotor mechanism and pulley assembly, said rotor mechanism including a radially extending pole member; a coil assembly including a coil housing and a coil mounted within said coil housing, said coil housing having an open end adjacent said pole member, said coil assembly being retained axially and radially by said interconnected rotor mechanism and pulley assembly, a bearing secured axially against an inner peripheral surface of said rotor mechanism for rotatably mounting said drive-components subassembly on said tubular extension, and an extended portion of said coil housing for abutting against said compressor end wall and an end face of said bearing; fastener means adjacent the other end face of said bearing for retaining said drive-components subassembly axially in place on said tubular extension; and an armature plate and drive plate subassembly mounted on said drive hub such that the armature plate thereof is positioned radially adjacent said pole member for being drivingly connected to said pole member upon energization of said coil.

3. For use with an air-conditioning compressor including a casing having a fixed tubular extension extending from an end wall thereof and a drive shaft extending centrally through said tubular extension with a drive hub secured to said drive shaft; an electromagnetic clutch comprising a drive-components subassembly rotatably mounted on said tubular extension, said drive-components subassembly including a sleeve member, a radially extending rotor secured to one end of said sleeve member, a bearing mounted within the other end of said sleeve member and around said tubular extension, a coil housing, a coil mounted within said coil housing, said coil housing having an open end adjacent said rotor and a substantially toroidal-shaped end portion opposite said open end, a radially inner face of said toroidal-shaped end portion abutting against an end face of said bearing, an axially extending flange formed on the outer edge of said radially extending rotor surrounding the open end portion of said coil housing, a cylindrical rim member detachably secured at one end thereof to said flange, and a pulley groove formed on the other end of said cylindrical rim member and extending radially inward of said cylindrical rim member intermediate said coil housing and said compressor end wall and serving to retain said coil housing in said drive-components subassembly; fastener means adjacent the other end face of said bearing for retaining said drive-components subassembly axially in place on said tubular extension with said toroidal-shaped end portion abutting against said compressor end wall; and an armature plate and drive plate subassembly mounted on said drive hub such that the armature plate thereof is positioned radially adjacent said rotor for being drivingly connected to said rotor upon energization of said coil.

4. For use with an air-conditioning compressor including a casing having a fixed tubular extension extending from an end wall thereof and a drive shaft extending centrally through said tubular extension with a drive hub secured to said drive shaft; an electromagnetic clutch comprising a drive-components subassembly rotatably mounted on said tubular extension, said drive components subassembly including a sleeve member having a counterbore formed in one end thereof, a radially extending rotor secured to the end of said sleeve member opposite said counterbore, a bearing secured in said counterbore and around said tubular extension, a coil housing, a coil mounted within said coil housing, said coil housing having an open end adjacent said radially extending rotor and an inwardly extending stepped wall on the end thereof opposite said open end, a flanged abutment formed on the radially inner portion of said stepped wall and abutting against an end face of said bearing, an axially extending flange formed on the outer edge of said radially extending rotor surrounding the open end portion of said coil housing, a cylindrical outer wall member detachably secured at one end thereof to said flange, and a pulley groove formed on the other end of said cylindrical outer wall member and extending radially inward of said cylindrical outer wall member intermediate said coil housing and said compressor end wall and serving to retain said coil housing in said drive-components subassembly; fastener means adjacent the other end face of said bearing for retaining said drive-components subassembly axially in place on said tubular extension with a portion of said stepped wall abutting against said compressor end wall; and an armature plate and drive plate subassembly mounted on said drive hub such that the armature plate thereof is positioned radially adjacent said rotor for being drivingly connected to said rotor upon energization of said coil.

5. For use with an air-conditioning compressor including a casing having a fixed tubular extension extending from an end wall thereof and a drive shaft extending centrally through said tubular extension with a drive hub secured to said drive shaft; an electromagnetic clutch comprising a drivecomponents subassembly rotatably mounted on said tubular extension, said drive-components subassembly including a sleeve member having a counterbore formed in one end thereof, a radially extending rotor secured to the end of said sleeve member opposite said counterbore, a bearing secured in said counterbore and around said tubular extension, a coil housing, a coil mounted within said coil housing, said coil housing having an open end adjacent said radially extending rotor and an inwardly extending stepped wall on the end thereof opposite said open end, a flanged abutment formed on the radially inner portion of said stepped wall and abutting against an end face of said bearing, an axially extending flange formed on the outer edge of said radially extending rotor surrounding the open end portion of said coil housing, a first cylindrical outer wall member detachably secured at one end thereof to said flange, and a pulley groove formed on the other end of said first cylindrical outer wall member and extending radially inward of said first cylindrical outer wall member intermediate said coil housing and said compressor end wall and serving to retain said coil housing in said drive-components subassembly; fastener means adjacent the other end face of said bearing for retaining said drive-components subassembly axially in place on said tubular extension with a portion of said stepped wall abutting against said compressor end wall; an armature plate and drive plate subassembly mounted on said drive hub such that the armature plate thereof is positioned radially adjacent said rotor for being drivingly connected to said rotor upon energization of said coil; and a damper mechanism operatively connected to said drive-components subassembly, said damper mechanism including a second cylindrical outer wall member detachably secured at one end thereof to said one end of said first cylindrical outer wall member and extending beyond said armature plate and drive plate subassembly, a cylindrical inner wall member concentric with said second cylindrical outer wall member, a radial end wall interconnecting respective ends of said second cylindrical outer wall and said cylindrical inner wall members, a rubber ring secured at the inner peripheral surface of said cylindrical inner wall member, and a metal ring member secured at the inner peripheral surface thereof to the outer peripheral surface of said rubber ring.

6. For use with an air-conditioning compressor including a casing having a fixed tubular extension extending from an end wall thereof and a drive shaft extending centrally through said tubular extension with a drive hub secured to said drive shaft; an electromagnetic clutch comprising a drive-components subassembly rotatably mounted on said tubular extension, said drive-components subassembly including a sleeve member having a counterbore formed in one end thereof, a radially extending rotor secured to the end of said sleeve member opposite said counterbore, a bearing mounted in said counterbore and around said tubular extension, means formed on said sleeve member for retaining said bearing in said counterbore, a coil housing, a coil mounted within said coil housing, said coil housing having an open end adjacent said radially extending rotor and an inwardly extending stepped wall on the end thereof opposite said open end, a flanged abutment formed on the radially inner portion of said stepped wall and abutting against an end face of said bearing, an axially extending flange formed on the outer edge of said radially extending rotor surrounding the open end portion of said coil housing, a cylindrical rim member detachably secured at one end thereof to saif flange, and a pulley groove formed on the other end of said cylindrical rim member and extending radially inward of said cylindrical rim member intermediate said coil housing and said compressor end wall and serving to retain said coil housing in said drive-components subassembly; an annular groove formed in said fixed tubular extension adjacent the end thereof, and a snap-ring mounted in said annular groove adjacent the other end face of said bearing for retaining said drive-components subassembly axially in place on said tubular extension with an end surface of said stepped wall abutting against said compressor end wall; and an armature plate and drive plate subassembly including a drive plate secured to said drive hub, radially extending armature plate positioned adjacent said rotor a predetermined variable air space width apart therefrom when said coil is in its deenergized condition, and a plurality of leaf springs, each connected at one end thereof to said drive plate and at the other end thereof to said armature plate.

7. For use with an air-conditioning compressor including a casing having a fixed tubular extension extending from an end wall thereof and a drive shaft extending centrally through said tubular extension with a drive hub secured to said drive shaft; an electromagnetic clutch comprising a drive-components subassembly rotatably mounted on said tubular extension, said drive-components subassembly including a sleeve member, a radially extending rotor secured to one end of said sleeve member, a shoulder formed on the inner periphery of said sleeve member a predetermined distance from the other end thereof, a bearing inserted in said other end of said sleeve member for mounting around said extension, a staked portion formed on said other end of said sleeve member for retaining said bearing in place in said sleeve member abutted against said shoulder, a coil housing, a coil mounted within said coil housing, said coil housing having an open end adjacent said radially extending rotor and an inwardly extending stepped wall on the end thereof opposite said open end, a flanged abutment formed on the radially inner portion of said stepped wall and abutting against an end face of said bearing, an axially extending flange formed on the outer edge of said radially extending rotor surrounding the open end portion of said coil housing, a cylindrical rim member detachably secured at one end thereof to said flange, and a pulley groove formed on the other end of said cylindrical rim member and extending radially inward of said cylindrical rim member intermediate said coil housing and said compressor end wall and serving to retain said coil housing in said drive-components subassembly; an annular groove formed in said fixed tubular extension adjacent the end thereof, and a snap-ring mounted in said annular groove adjacent the other end face of said bearing for retaining said drive-components subassembly axially in place on said tubular extension with an end surface of said stepped wall abutting against said compressor end wall; and an armature plate and drive plate subassembly including a drive plate secured to said drive hub, a radially extending armature plate positioned adjacent said rotor a predetermined variably air space width apart therefrom when said coil is in its deenergized condition, and a plurality of leaf springs, each connected at one end thereof to said drive plate and at the other end thereof to said armature plate.

* * * * *